United States Patent [19]

Rodi et al.

[11] Patent Number: 4,951,567

[45] **Date of Patent: * Aug. 28, 1990**

[54] ELECTRONIC SAFETY SYSTEM FOR A PRINTING MACHINE

[75] Inventors: Anton Rodi, Leimen; Hans Müller, Sandhausen; Michael Lehnert, Heidelberg, all of Fed. Rep. of Germany

[73] Assignee: Heidelberger Druckmaschinen AG, Heidelberg, Fed. Rep. of Germany

[*] Notice: The portion of the term of this patent subsequent to Mar. 22, 2005 has been disclaimed.

[21] Appl. No.: 376,937

[22] Filed: Jul. 7, 1989

Related U.S. Application Data

[63] Continuation of Ser. No. 46,260, May 4, 1987, abandoned.

[30] Foreign Application Priority Data

May 2, 1986 [DE] Fed. Rep. of Germany ....... 3614979

[51] Int. Cl.[5] ......................... B41F 5/00; B41F 33/12; F16D 67/06; B60K 41/24

[52] U.S. Cl. ............................ 101/216; 101/DIG. 41

[58] Field of Search ....... 101/216, 212, 219, DIG. 41, 101/181; 318/490; 364/426.01; 73/121; 192/0.032, 0.033, 0.042, 0.049, 1.24, 1.23; 303/92, 93

[56] References Cited

U.S. PATENT DOCUMENTS 4,643,091 2/1987 Fairey ................................ 101/233
4,733,148 3/1988 Rodi .................................. 318/490

*Primary Examiner*—J. Reed Fisher
*Attorney, Agent, or Firm*—Herbert L. Lerner; Laurence A. Greenberg

[57] ABSTRACT

Safety system for a printing machine having at least one machine drive, a brake device and an electronic control system therefor. The electronic control system has power control stages which permit electronic braking of the drive assembly, and a monitoring circuit, to which can be fed nominal and actual values of the speed of the drive assembly, and which actuate the brake device in the case of impermissibly high deviation between a nominal value and an actual value. Accelerations and decelerations necessary in the operation of the printing machine are achieved by suitable control of the respective machine drive.

10 Claims, 3 Drawing Sheets

ELECTRONIC SAFETY SYSTEM FOR A PRINTING MACHINE

This application is a continuation of application Ser. No. 046,260, filed May 4, 1987, now abandoned.

The invention relates to a safety system for a printing machine which features at least one drive and brake device and an electronic control system.

To comply with safety regulations, various safety devices are known on printing machines. For instance, the various drives of a printing machine are equipped with brakes, in which the brake force is exerted by springs and a corresponding voltage is applied to electromagnets to release or lift the brakes.

In the case of conventional printing machines, the brakes are used both as service brakes as well as for emergencies. This situation leads to undesirable wear of the brakes.

Furthermore, emergency stop switches are provided at and, if necessary or desirable, in the vicinity of various points on the printing machine, with the aid of which the printing machine can be stopped. To permit the motors to be stopped as well as the brakes to be applied without auxiliary electrical power, in the case of conventional safety devices, the emergency stop switches are constructed with a normally-closed contact and are connected in series.

It is accordingly an object of the invention to provide an electronic safety system for a printing machine which controls the sequence of movement of the printing machine by purely electrical means so that predetermined delays can be provided, and whereby braking is necessary only when errors occur in the electronic control system of the safety system.

With the foregoing and other objects in view, there is provided in accordance with the invention, an electronic safety system for a printing machine, having an electronic control system comprising power control stages which permit electronic braking of the drive assembly by respective brake devices, the electronic control system further comprising a monitoring circuit, to which set values and actual values of the drive speed can be fed and which operates the brake device in the case of impermissibly high deviation between nominal and actual values of the drive speed, accelerations and delays necessary during operation of the printing machine being achieved by suitable control of the drive assembly.

To provide further safety, in accordance with another feature of the invention the brake is operated by means of an electromagnet, the brake being released against a spring force when the electromagnet is switched off.

In accordance with a further feature of the invention, two contact pairs are provided in series connection with the electromagnet, each contact pair being controlled by a respective contactor, and the contactors being controlled by separate output circuits of the electronic control system.

In accordance with an added feature of the invention and in order to provide protection against a failure to bring the drive to a stop when, due to a fault, for example, in the power stages, a maximum possible torque is developed, the brake device is so constructed that the printing machine is brought to a stop even when the drive develops its highest possible torque.

When a series of defects occurs in the electronic control system, operation of the brake is not necessary even when there is an impermissibly high deviation between nominal and actual values, provided that the power control stages and, if necessary or desirable, control stages linked to them remain functioning. In accordance with an additional feature of the invention, the monitoring circuit has means for sending braking signals to the power control stages for braking the printing machine before operating the brake device, and means for checking the deviation between the desired and the actual speed value of the machine.

Because the brake device is used very seldomly in the printing machine according to the invention, it is possible that a fault occurring in the brake device may not be noticed. For this reason, in accordance with again another feature of the invention, means are provided for checking the brake device by operating the brake device, controlling the drive assembly to the highest possible torque, and evaluating the actual speed value.

In accordance with again a further feature of the invention, the means for checking the brake device are enabled after the electronic control system has been switched on.

In accordance with again an added feature of the invention there are provided at least two computers connected with the electronic control system, the monitoring circuit comparing safety-related functions of the computers, and means for assigning control of the drive from one of the computers to the other computer in case of failure of the one computer.

.In accordance with again an additional feature of the invention, further brake devices, operatively associated with further drives, the further brake devices being controllable by the monitoring circuit.

In accordance with yet another feature of the invention, means are provided for feeding emergency stop signals in parallel with the monitoring circuit to said power control stages and to at least one of said computers.

In accordance with yet a further feature of the invention there are provided a plurality of emergency stop switches, each having first and second pairs of contacts actuatable in parallel, the first pairs of contacts being connected in series and forming a safety current loop, and the second contact pairs being connected individually to inputs of the electronic control system. This construction provides additional safety and affords a possibility of localizing a released or defective emergency stop switch. The basic advantages of the series connection of all of the emergency stop switches is retained. In particular, an emergency shut-down cannot be missed because a voltage source necessary for sending the emergency stop signal is not present.

In accordance with yet an added feature of the invention an AC voltage for feeding the safety current loop is provided, as well as a transformer having a primary and secondary winding, the primary winding is connected in series with the first pair of contacts, and the secondary winding is connected via a rectifier to the power control stages, the monitoring circuit and at least one of the computers. This arrangement permits the safety current loop to be adapted or matched to semiconductor circuits without requiring the voltage supplying the safety control loop to be so low that a reliable flow of current may be questionable by the series connection of many contacts.

The additional information gained by the additional pairs of contacts can be evaluated in many different ways.

The emergency stop switches serve to stop the entire machine as rapidly as possible when danger arises. Disturbances or disruptions are possible which require only that the machine be shut down in successive steps.

In accordance with a concomitant feature of the invention there is provided at least one program for stopping the printing machine, the program being selectable by the electronic control system.

A preselected mode of shutdown of the printing machine is thereby possible, depending upon which of the emergency stop switches has been actuated. It may thus be advantageous, for example, to stop the drive of the paper feeder immediately with the actuation of a switch, yet allow the main drive to continue running until the sheets remaining in the machine have exited from the machine.

Other features which are considered as characteristic for the invention are set forth in the appended claims.

Although the invention is illustrated and described herein as embodied in an electronic safety system for a printing machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Like parts are identified by the same reference numerals in the figures.

Figure 1:
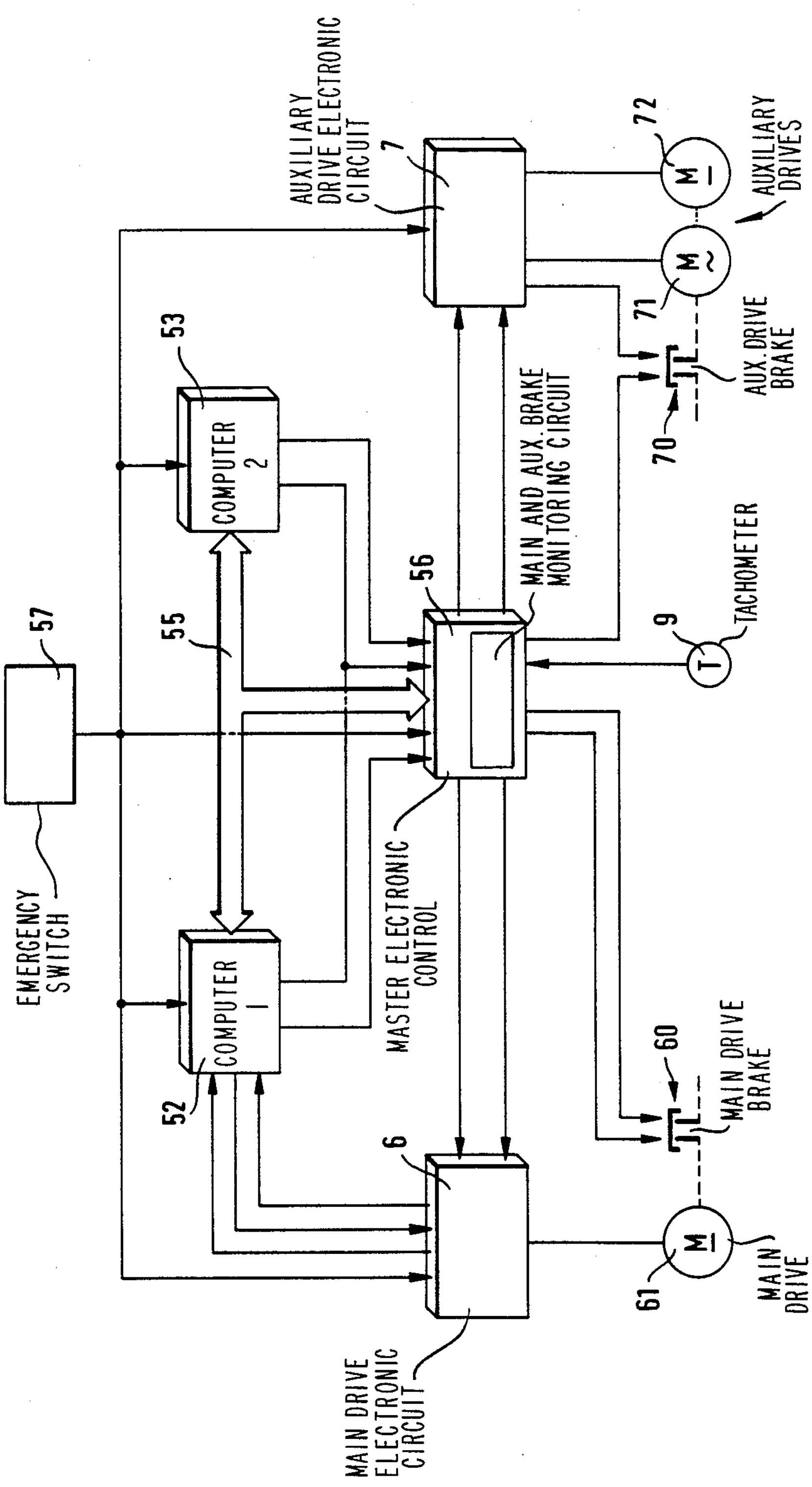
FIG. 1 is a block diagram of an electronic brake control and monitoring or safety system showing the major building blocks thereof.

In an electronic brake control and monitoring and safety system shown in FIG. 1, are a main drive 61 and various auxiliary drives, of which only two auxiliary drives 71, 72 are shown. The drives are controlled by two computers 52, 53. The computers 52, 53 are linked with each other and with a master electronic control 56 with the aid of a bus system 55.

In addition to power control stages, a main drive electronic circuit 6 and an auxiliary drive electronic circuit 7 are provided which also comprise the corresponding control stages which are equipped with microprocessors in a practical realization of the invention.

The master electronic control 56 performs multiple function tasks and include different components. To understand the invention, however, it is only necessary to explain the brake monitoring function, included in the master electronic control 56.

A tachometer 9 feeds the actual value of the machine speed or the main drive speed to the master electronic control 56. A nominal speed value is supplied via the bus system 55. In case the deviation between the nominal value and the actual value is within a certain range which corresponds to a normal acceptable deviation, the master electronic control 56 supplies current to two contactors 67, 68 which control the main brake, not illustrated in FIG. 1, so that the main brake for the main drive is released.

If a permissible deviation between the nominal value and the actual value is exceeded, the monitoring circuit in the master electronic control 56 sends signals to the main drive electronic circuit 6 in order to stop the main drive 61. These signals can cause the trigger drive pulses of the brake power control stages to be inhibited.

If the main drive electronic circuit 6 is functioning properly in the case of a fault condition, the machine speed is quickly reduced by means of electrical braking when the monitoring circuit sends a signal to stop the main drive, making further measures unnecessary.

If, however, a defect occurs in the main drive electronic circuit 6 which results in failure of electrical braking, the printing machine can be shut down by operating the main drive brake 60. In this case, the monitoring circuit sends a signal to inhibit the trigger pulses for the main drive electronic circuit 6 to avoid continued power supply to the main drive 61, providing that the defect in the main drive electronic circuit 6 permits this.

Figure 2:
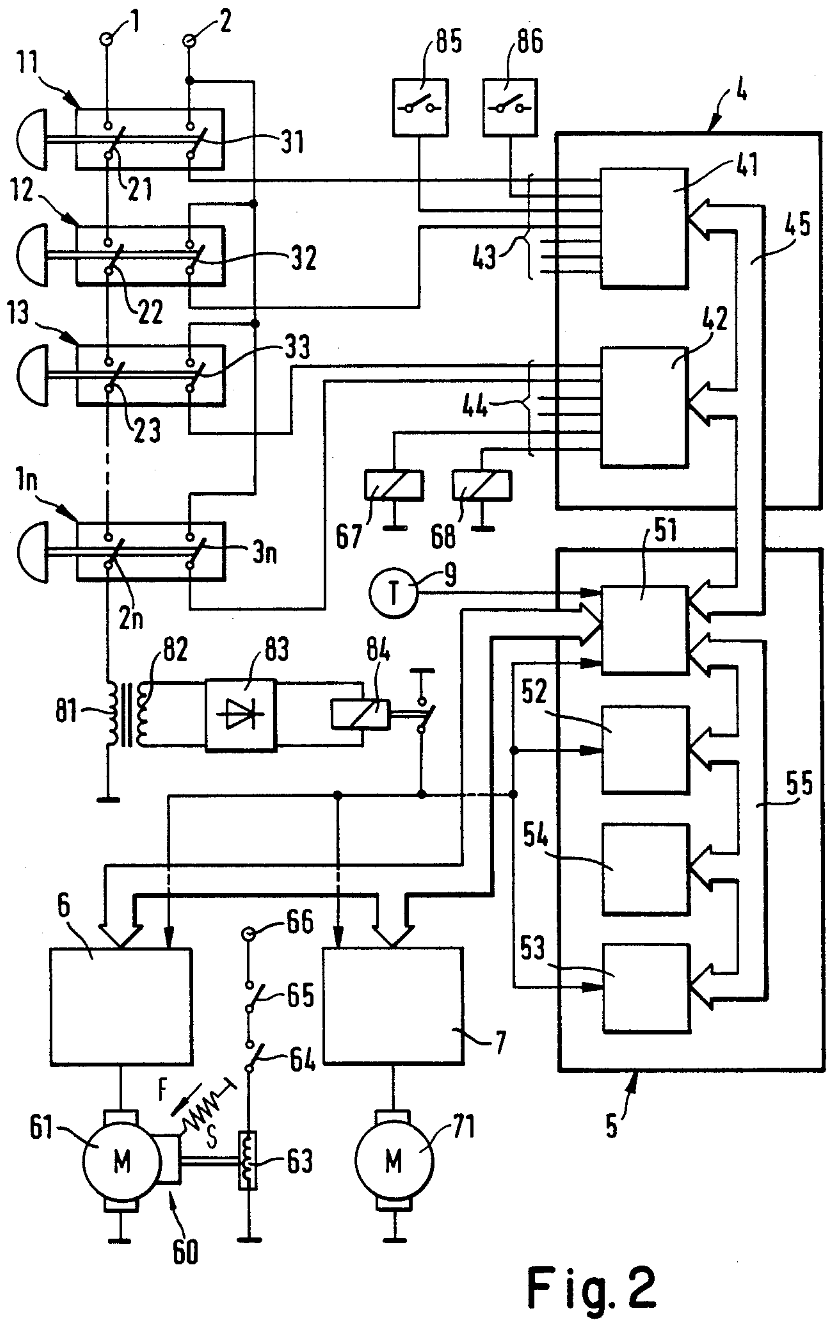
FIG. 2 is a block diagram of a further electronic control showing emergency stop devices arranged in accordance with a preferred embodiment of the invention.

The brake 60 is advantageously arranged such that the brake 60 is released by means of a electromagnet 63 which releases the brake 60 against a spring force F of a spring S, seen in FIG. 2. When the electromagnet is switched off, the brake 60 is again applied, braking the drive 61.

The monitoring circuit further monitors the function of the computers 52, 53 and can, if necessary, in the case of failure of one computer, transfer functions relevant to safety to the other computer.

In addition, the monitoring circuit monitors the auxiliary drive electronic circuit 7, the auxiliary drives 71, 72 and a brake device 70 assigned to the auxiliary drive 71.

If an emergency stop signal is triggered by a related emergency stop switch device 57, it is transferred by the computers 52, 53 to the auxiliary drive electronic circuit 7 of the auxiliary drives and to the master electronic control 56. Providing there is no defect in the electronic control system, the printing machine is stopped as described above without the aid of the brakes. Only if a defect occurs which prevents this, is the printing machine stopped with the aid of the brakes.

FIG. 2 shows emergency stop switches 11 to 1*n* which are connected to an electronic control system for a printing machine. The latter includes an input/output unit 4, control processor 5 and power control stages including drive electronic circuits 6, 7 respectively assigned to motors 61, 71. The power control stages correspond to the main drive electronic circuit 6 of the main drive 61 and the auxiliary drive electronic circuit 7 of the auxiliary drive 71, 72 (FIG. 1). For the sake of clarity, only three motors have been illustrated, i.e. the motor 61 of the main drive and motor 71 and 72 of an auxiliary drive, although printing machines can have considerably more motors. The construction of the electronic control system details is possible in many ways while still remaining within the framework of the invention. In the case of the illustrated exemplary embodiment, the input/output unit 4 features two input-/output circuit boards 41, 42 each of which have a large number of inputs and outputs 43, 44. The input/output circuit boards 41, 42 are linked with each other and with the input/output control circuit board 51, which also contains the monitoring circuit, and the central control processor 5 via a bus system 45.

Two computers 52, 53 are provided in the central processor which, as such, perform different tasks, and are programmed in such a way that in the case of failure of one of the computers 52, 53 the other computer takes over the functions of the failed computer, in particular functions relating to safety. The central control processor 5 further includes a memory circuit board 54 to store data, for instance data relating to the printing machine and data relating to the orders to be processed. For this purpose, non-volatile memories are provided on the memory circuit board 54. In a practically constructed electronic control system, the programs themselves are stored in read-only memories (ROMs) which are arranged on the circuit boards of the computers 52, 53. However, other configurations for storing the programs within the framework of the invention are also possible. A bus system 55 connects the input/output control 51, the computers 52/53 and the memory board 54.

While, in the case of the presented electronic control system, the input/output unit 4 is provided for binary signals (for example, switch closed, switch open; relay energized, relay deenergized), the output of the digital signals which serve for the control of the drive electronic circuits 6, 7 and therefore of the motors 61, 71, takes place via the input/output control 51. Furthermore, a signal corresponding to the machine speed is fed to the input/output control 51 by the tachometer 9.

Of several brake units assigned to the motors, only the main drive brake unit 60 assigned to the main drive 61 is presented schematically. Operating voltage is fed at point 66 to an electromagnet 63 to lift the brake via two contacts 64, 65 of two contactors 67, 68, respectively. The contacts 64, 65 are constructed as normally open contacts so that the brake is lifted only when both contacts 64, 65 are closed which, in turn, occurs only when both contactors 67, 68 are supplied with voltage by the input/output unit 4.

The emergency stop switches, of which, for the sake of clarity, only the emergency stop switches 1,1, 1,2, 1,3 and 1,n are illustrated, can be equipped with mushroom-type push buttons. Other actuating devices can, however, be provided such as levers, contact strips and switches which are actuated when safety gates are opened. Each of the emergency stop switches 1,1 to 1,n features two pairs of contacts 2,1 to 2,n, 3,1 to 3,n constructed as normally closed contacts. Each of the first pairs of contacts 2,1 to 2,n are connected in series and connect a connection point 1 with main voltage supplied to the primary winding 81 of a transformer having secondary winding 82.

A rectifier 83 is connected to the secondary winding 82 of the transformer. In this way, galvanic isolation is achieved between the safety current loop formed by the series connection of the first pairs of contacts 2,1 to 2,n and the primary winding 81, on the one hand, and the subsequent circuits, on the other hand. In addition, the switching voltage is reduced to a value suitable for driving semiconductor circuits, while the voltage feeding the safety current loop has a sufficiently large value to ensure reliable flow of current despite the series connection of many pairs of contacts. Corresponding inputs of the electronic drive circuits 6, 7, of the computers 52, 53 and of the input/output control 51 are connected to the safety circuit via a contactor 84.

The second pairs of contacts 3,1 to 3,n of the emergency stop switches 1,1 to 1$n$ are connected to the inputs of the input/output unit 4 of the electronic control system.

If one of the emergency stop switches 1,1 to 1,n is actuated, the safety current loop is interrupted so that the primary winding 81 is no longer supplied with main voltage via the connection point 1. Consequently, the secondary voltage as well as the output voltage of the rectifier 83 is zero and the contactor 84 is deenergized. These procedures require a given time, while, triggered by opening of the second contact of the actuated emergency stop switch, corresponding program steps to shut down the printing machine already present in the electronic control system are initiated 5.

Should defects occur in the input/output unit 4 or in the central processor 5 which prevent effective transfer of signals given by the second contacts 3,1 to 3,n of the emergency stop switches 1,1 to 1,n, the printing machine is stopped nevertheless despite this by the safety circuit formed by the first contacts 2,1 to 2,n, the transformer 81, 82, the rectifier 83 and the contactor 84.

As described hereinbefore in connection with FIG. 1, the brake electromagnet 63 is operated only when the electronic control system is not able to stop the printing machine by means of electrical braking. For this purpose, the power supply to the contactors 67, 68 is cut off, so that, as a result, the electromagnet 63 is disconnected with the aid of the contacts 64, 65 from the operating voltage supplied at point 66. Although, in the case of the device in accordance with FIG. 2, the contactors 67, 68 are controlled by the input/output unit 4, to ensure a high degree of safety, two separate output circuits are provided for the contactors 67, 68.

Nonscheduled shut-down of the printing machine may be required even if there is no real emergency situation. For this purpose, further switches 85, 86 can be connected to inputs of the input/output unit 4. With the aid of those switches, programs can be selected, resulting in specific shut-down of the printing machine corresponding to the particular situation.

Figure 3:
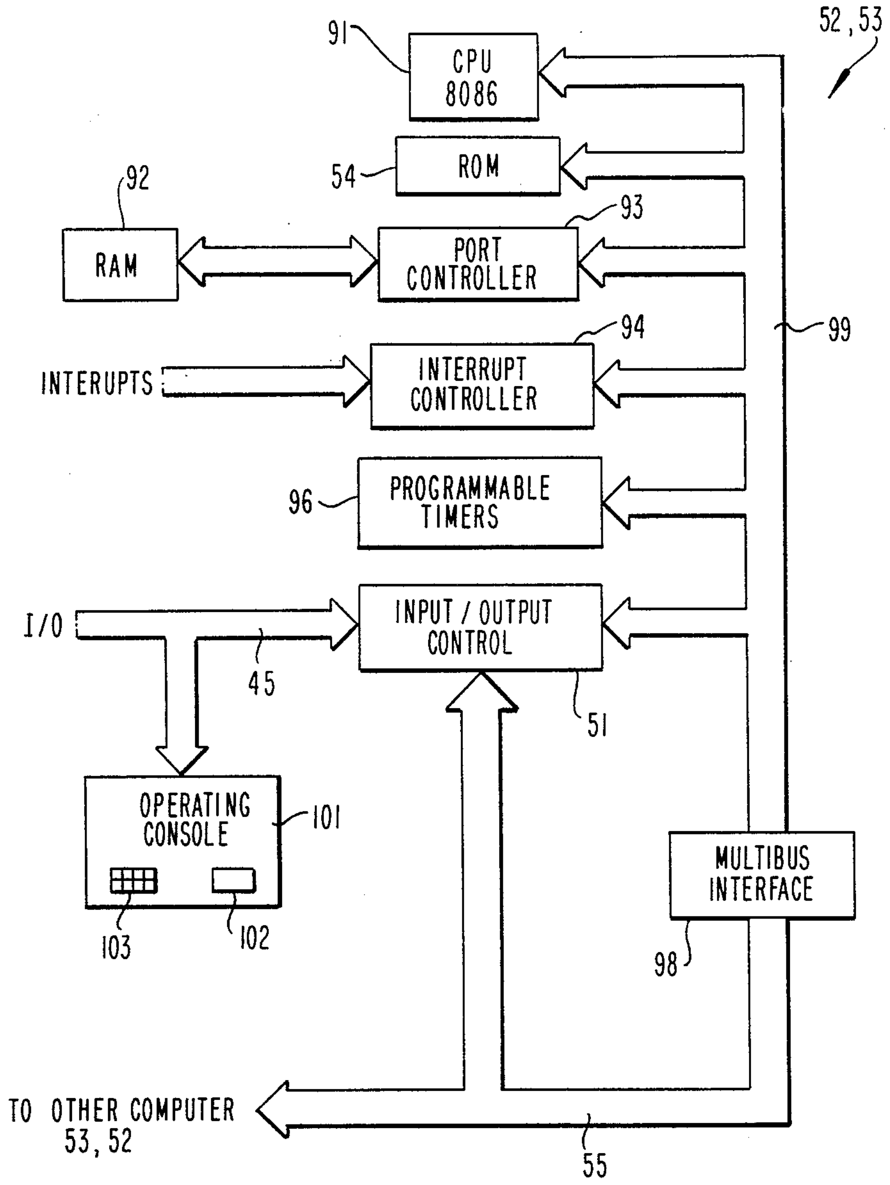
FIG. 3 is a block diagram of one of the computers of FIG. 1, showing its basic building blocks.

FIG. 3 is a block diagram of the computer 52, 53 showing the CPU (Central Processing Unit) 91 which, in an exemplary embodiment of the invention, is an Intel type 8086 circuit. The CPU 91 is connected via bus 99 with the ROM 54, which contains the control programs in memory; a port controller 93, which interfaces with a RAM 92, serving to store all transient and variable data; an interrupt controller 94 which receives machine interrupts as required to serve functions that cannot wait for completion of other programs; programmable timers 96, which serve to provide timing and delay functions as required in starting, stopping and operation of the printing machine; and an input/output control 51, which serves as the main input/output device for the various machine elements, including the brakes and the power control stages 6 and 7. A multibus interface 98 provides communications between the two computers 52 and 53 via bus 55, which is also connected to the input/output control 51, so that either one of the computers can exercise control over the entire printing machine.

An operating control console 101, connected to bus 45, having input keys 103 for setting desired speed values and a display 102, is provided.

The two circuits 4 and 5 are configured as separate plug-in circuit boards. Circuit 4 which is the input/output unit, seen in FIG. 2 includes two identical input- /output circuit cards 41, 42 which may, for example be of the type Intel's Programmable I/O Board ISBC 519. As shown in FIG. 2 and 3, the input/output control 51 is connected via bus 45 to the input/output unit 4.

The input/output control 51 may for example be an Intel circuit ISBC 517. The computer 52, 53 and ROM 54 is typically an Intel single board computer ISBC 86/12A, which is accessed through the aforesaid input-/output control 51, and performs a number of tasks required for operation of the printing machine, including the brake and power control as described hereinabove.

The power control stages 6 and 7 are typically constructed as conventional thyristor or transistor amplifier power controllers, which provide drive power for the associated machine drives.

The master electronic control 56, seen in FIG. 1 includes circuit board 51, seen in FIG. 2 and 3.

The block 1,1 "Emergency Switch" 57 in FIG. 1 is composed of blocks 1,1 1,2 1,3 . . . 1,n, and blocks 81, 82, 83 and 84, seen in FIG. 2.

We claim:

1. Safety system for a printing machine comprising at least one machine main drive having nominal and actual speed values; at least one main drive brake for braking the main drive; a master electronic control including a main brake monitoring circuit connected to said main drive brake for controlling the main drive brake, a main drive electronic circuit responsive to said master electronic control for electronically controlling said actual speed values of the main drive, a tachometer coupled to said main drive for generating said actual speed values, and connected to the master electronic control for transmitting said actual speed values, said master electronic control being responsive to said main brake monitoring circuit for operating the main drive brake in response to an impermissibly high deviation between said nominal and said actual speed values of the main drive; further including an opposing spring engaging said main drive brake for applying a braking force to said main drive brake, and an electromagnet connected to said master electronic control, in operative engagement with said main drive brake for applying the main drive brake with the force of said opposing spring, in response to said electromagnet being switched off by said master electronic control, and further including emergency switch means connected to said master electronic control for feeding emergency stop signals in parallel with said main brake monitoring circuit to said main drive electronic circuit for initiating braking action in response to actuation of said emergency switch means.

2. Safety system according to claim 1, including two contactors controlled by said master electronic control, each contactor having a contact pair, said contact pairs in series connection with said electromagnet, each of said contactors connected to respective separate output circuits of said master electronic control for effecting said switching off of said electromagnet.

3. Safety system in accordance with claim 1, wherein said main drive brake has sufficient braking force to stop the printing machine when a highest possible drive power is applied by the main drive electronic circuit.

4. Safety system in accordance with claim 1, wherein said main brake monitoring circuit includes means for sending electrical braking signals to said main drive electronic circuit for electrically braking the printing machine before operating the main drive brake and means for determining said impermissibly high deviation between the nominal and actual speed values of said main drive.

5. Safety system in accordance with claim 1, including means for checking the main brake, said main brake checking means including means for operating the main brake and simultaneously energizing the main drive to a highest possible torque, and evaluating a resulting actual speed value.

6. Safety system in accordance with claim 5 wherein said means for checking the main brake include means for applying the brake after switching-on the master control.

7. Safety system in accordance with claim 1 including at least a first and a second computer each having outputs, the outputs of the first computer being connected to inputs of said master electronic control, means for comparing the outputs of said first and second computer, and switching means responsive to said comparing means for switching the inputs of said master electronic control to the outputs of said second computer in response to said comparing means finding a difference between the outputs of said first and second computer.

8. Safety system in accordance with claim 1 including auxiliary drives having respective auxiliary drive brakes and respective auxiliary brake monitoring circuits, said auxiliary drive brakes being controlled by said auxiliary brake monitoring circuits.

9. Safety system in accordance with claim 7, wherein said emergency switch means include a plurality of emergency stop switches, each emergency stop switch having a respective first and second pair of contacts, wherein said first pair of contacts are connected in series forming a safety current loop, and said second pair of contacts are connected to respective inputs of said master electronic control.

10. Safety system in accordance with claim 9, including at least one auxiliary drive having a respective auxiliary drive brake, an auxillary drive electronic circuit and a respective auxiliary brake monitoring circuit, said auxiliary drive brake being controlled by said auxiliary brake monitoring circuit, an operating voltage source connected to said safety current loop, and a transformer having a primary and a secondary winding, said primary winding being connected in series with said safety current loop, a rectifier having an input connected to said secondary winding and an output connected to said auxiliary drive electronic circuit, said auxiliary brake monitoring circuit and at least one of said first and second computers.

* * * * *